United States Patent
Kang et al.

(10) Patent No.: US 12,527,655 B2
(45) Date of Patent: Jan. 20, 2026

(54) OCCLUSION ALIGNMENT METHOD AND OCCLUSION ALIGNMENT APPARATUS

(71) Applicant: MEDIT CORP., Seoul (KR)

(72) Inventors: Dong Hwa Kang, Seoul (KR); Du Su Kim, Seoul (KR)

(73) Assignee: MEDIT CORP., Seoul (KR)

( * ) Notice: Subject to any disclaimer, the term of this patent is extended or adjusted under 35 U.S.C. 154(b) by 349 days.

(21) Appl. No.: 18/036,542

(22) PCT Filed: Nov. 10, 2021

(86) PCT No.: PCT/KR2021/016307
§ 371 (c)(1),
(2) Date: May 11, 2023

(87) PCT Pub. No.: WO2022/103141
PCT Pub. Date: May 19, 2022

(65) Prior Publication Data
US 2024/0008966 A1    Jan. 11, 2024

(30) Foreign Application Priority Data
Nov. 13, 2020 (KR) .................. 10-2020-0152159
Jan. 26, 2021 (KR) .................. 10-2021-0010977

(51) Int. Cl.
| | |
|---|---|
| *A61C 19/05* | (2006.01) |
| *A61C 7/00* | (2006.01) |
| *A61C 9/00* | (2006.01) |
| *G06T 7/00* | (2017.01) |

(52) U.S. Cl.
CPC .............. *A61C 19/05* (2013.01); *A61C 7/002* (2013.01); *A61C 9/0053* (2013.01); *G06T 7/0012* (2013.01); *G06T 2207/30036* (2013.01)

(58) Field of Classification Search
CPC ......... G06T 7/0012; G06T 2207/30036; A61C 7/002; A61C 9/0053; A61C 19/05
See application file for complete search history.

(56) References Cited

U.S. PATENT DOCUMENTS

| | | | |
|---|---|---|---|
| 10,561,476 B2 | 2/2020 | Matov et al. | |
| 10,736,721 B2 * | 8/2020 | Ohtake | .................. G06T 7/0012 |
| 12,127,814 B2 * | 10/2024 | Elbaz | .................... A61B 5/0088 |

(Continued)

FOREIGN PATENT DOCUMENTS

| | | | |
|---|---|---|---|
| CN | 108542517 A | * | 9/2018 |
| CN | 108776996 A | | 11/2018 |

(Continued)

OTHER PUBLICATIONS

Broll, Alexander, et al. "A data-driven approach for the partial reconstruction of individual human molar teeth using generative deep learning." Frontiers in Artificial Intelligence 7 : 1339193 (Year: 2024).*

(Continued)

*Primary Examiner* — Scott A Rogers
(74) *Attorney, Agent, or Firm* — Sughrue Mion, PLLC

(57) ABSTRACT

An occlusion alignment method according to the present disclosure includes: extracting at least one tooth area data from upper jaw scan data and lower jaw scan data; and adjusting an occlusion position of the upper jaw scan data and the lower jaw scan data using the at least one tooth area data.

16 Claims, 10 Drawing Sheets

(56) References Cited

U.S. PATENT DOCUMENTS

| | | | |
|---|---|---|---|
| 12,307,693 B2* | 5/2025 | Shin | G06T 7/00 |
| 2014/0071126 A1 | 3/2014 | Barneoud et al. | |
| 2015/0142400 A1* | 5/2015 | Matov | G06F 30/20 |
| | | | 345/420 |
| 2016/0008116 A1* | 1/2016 | Glinec | G06T 19/20 |
| | | | 433/29 |
| 2018/0146934 A1 | 5/2018 | Ripoche et al. | |
| 2018/0206958 A1* | 7/2018 | Ohtake | G06T 19/20 |
| 2020/0268495 A1* | 8/2020 | Ryakhovsky | A61C 13/34 |
| 2023/0121899 A1* | 4/2023 | Naumovets | A61C 9/0046 |
| | | | 433/24 |
| 2023/0122558 A1* | 4/2023 | Aamodt | A61B 6/032 |
| | | | 433/24 |
| 2024/0005499 A1* | 1/2024 | Go | G16H 20/30 |
| 2024/0033057 A1* | 2/2024 | Saphier | A61C 9/0053 |
| 2024/0173100 A1* | 5/2024 | Lee | A61C 9/0053 |
| 2024/0268929 A1* | 8/2024 | Lee | A61C 9/00 |
| 2024/0374347 A1* | 11/2024 | Schwerin | A61C 7/002 |

FOREIGN PATENT DOCUMENTS

| | | | |
|---|---|---|---|
| CN | 115457196 A | * | 12/2022 |
| CN | 116250955 A | * | 6/2023 |
| CN | 112184910 B | * | 11/2023 |
| KR | 10-2015-0128713 A | | 11/2015 |
| KR | 10-1590140 B1 | | 1/2016 |
| KR | 10-2018-0087853 A | | 8/2018 |
| KR | 10-2160097 B1 | | 9/2020 |
| WO | 2011/103876 A1 | | 9/2011 |

OTHER PUBLICATIONS

Ping, Yuhan, et al. "A Rule-based Optimization Method for Tooth Alignment." IEEE Transactions on Visualization and Computer Graphics (Year: 2025).*

Dong, ZhenXing, et al. "Transformer-Based Tooth Alignment Prediction With Occlusion and Collision Constraints." arXiv preprint arXiv:2410.20806 (Year: 2024).*

Korean Office Action dated Jul. 20, 2022 in Application No. 10-2021-0010977.

Extended European Search Report issued Jun. 26, 2024 in European Application No. 21892308.4.

International Search Report for PCT/KR2021/016307 dated Feb. 23, 2022 (PCT/ISA/210).

* cited by examiner

OCCLUSION ALIGNMENT METHOD AND OCCLUSION ALIGNMENT APPARATUS

CROSS REFERENCE TO RELATED APPLICATIONS

This application is a National Stage of International Application No. PCT/KR2021/016307 filed Nov. 10, 2021, claiming priorities based on Korean Patent Application No. 10-2020-0152159 filed Nov. 13, 2020 and Korean Patent Application No. 10-2021-0010977 filed Jan. 26, 2021, the entire disclosures of which are incorporated herein by reference.

TECHNICAL FIELD

The present disclosure relates to an occlusion alignment method and an occlusion alignment apparatus, and more particularly, to a method of determining an optimal occlusion position using a tooth area, and an apparatus using the same.

BACKGROUND

In the field of dentistry, it is important to acquire an accurate 3D tooth model corresponding to the state of teeth being clamped during a treatment process (for example, orthodontics). With the development of three-dimensional scanning technology, a three-dimensional model of the inside of a patient's oral cavity including teeth, gingiva, dental arch, etc. can be acquired and used for analysis. In addition, a user (therapist) can acquire more accurate oral cavity information of the patient when compared to conventional alginate impression taking, and can provide treatment corresponding to the oral cavity information.

Meanwhile, after obtaining the three-dimensional model of the inside of the patient's oral cavity, an occlusion plane of the patient may be acquired based on the obtained three-dimensional model. However, when three-dimensional scanning is performed, an occlusion plane acquired may appear differently depending on the patient's masticatory force. A periodontal ligament of the patient is pressed according to the masticatory force, and the height at which the periodontal ligament can be pressed anatomically is about 0.2 mm. If the patient's masticatory force is strong, the periodontal ligament may be pressed too much. Conversely, if the patient's masticatory force is weak, the periodontal ligament may be pressed too little. That is, since the degree of occlusion obtained according to the patient's masticatory force is different, compensation in consideration of the patient's masticatory force is required for the acquired data.

SUMMARY

In accordance with the above requirement, the present disclosure provides an occlusion alignment method and an occlusion alignment apparatus for performing compensation alignment so that the upper jaw or lower jaw of a patient has optimal occlusion.

The technical objectives of the present disclosure are not limited to the above-mentioned technical objectives, and other technical objectives not mentioned will be clearly understood by those skilled in the art from the description below.

According to an embodiment of the present disclosure, there provided an occlusion alignment method of extracting at least one tooth area data from acquired upper jaw scan data and lower jaw scan data and adjusting an occlusion position of the upper jaw scan data and lower jaw scan data using the extracted tooth area data.

Meanwhile, an occlusion alignment apparatus according to the present disclosure includes components for performing the occlusion alignment method, particularly an area extraction unit for extracting tooth area data and a compensation alignment unit that performs a process of acquiring alignment data having an optimal occlusion position using the extracted tooth area data.

The occlusion alignment method and the occlusion alignment apparatus according to the present disclosure may further include additional components in addition to the above-mentioned components.

By using the occlusion alignment method and the occlusion alignment apparatus according to the present disclosure to appropriately compensate for and align the occlusion with respect to the patient's bite acquired and measured by the three-dimensional scanning method, there is an advantage of optimizing occlusion alignment by taking the intensity of the patient's masticatory force into account.

In addition, by selecting data suitable for the patient's actual oral cavity among data aligned based on the upper jaw scan data, the lower jaw scan data, and the occlusion scan data, and data generated through compensation alignment, there is an advantage of providing appropriate treatment for the patient.

EXPLANATION OF REFERENCE NUMERALS

Figure 1:
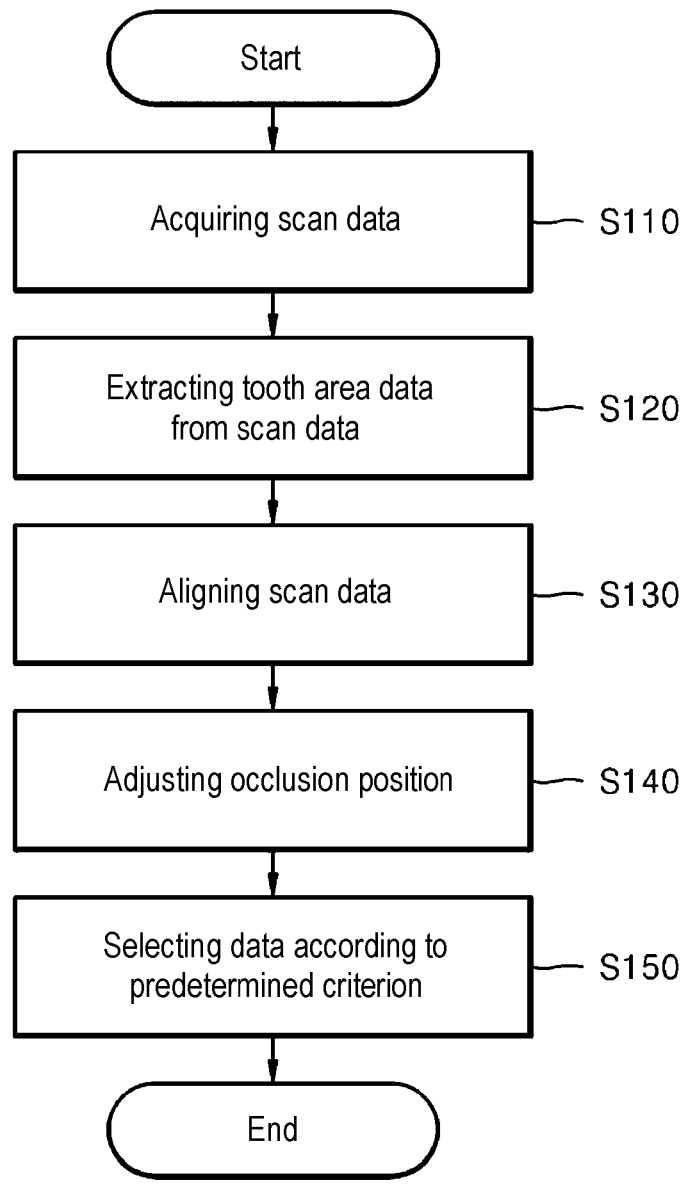
FIG. 1 is a flowchart of an occlusion alignment method according to the present disclosure.

S110: acquiring scan data
S120: extracting data
S130: aligning scan data

S140: adjusting occlusion position
S150: selecting data
100: scan data 101: upper jaw scan data
102: lower jaw scan data 103: first occlusion scan data
104: second occlusion scan data
200: gingiva scan data
300: tooth scan data
400: line
501, 502, 503: buccal area data
1: occlusion alignment apparatus
11: scanning unit 12: area extraction unit
13: DB unit 14: alignment unit
15: compensation alignment unit 16: data selection unit
17: display unit

DETAILED DESCRIPTION

Hereinafter, some embodiments of the present disclosure will be described in detail through the exemplary drawings. In adding reference numerals to components of the drawings, it should be noted that same components have the same reference numerals as possible even if they are shown on different figures. In addition, in describing an embodiment of the present disclosure, if it is determined that a detailed description of a related known configuration or function hinders understanding of the embodiment of the present disclosure, the detailed description thereof will be omitted.

In describing components of an embodiment of the present disclosure, the terms such as first, second, A, B, (a), and (b) may be used. These terms are merely used to distinguish the component from other components, and the nature, order, or sequence of the corresponding component is not limited by the term. In addition, unless defined otherwise, all terms used herein, including technical or scientific terms, have the same meaning as commonly understood by those skilled in the art to which the present disclosure pertains. Terms such as those defined in commonly used dictionaries should be interpreted as having a meaning consistent with the meaning in the context of the related art, and they should not be interpreted in an ideal or excessively formal meaning unless explicitly defined in the present disclosure.

FIG. 1 is a flowchart of an occlusion alignment method according to the present disclosure.

The occlusion alignment method according to the present disclosure includes a step S110 of obtaining scan data including upper jaw scan data (maxilla scan data), lower jaw scan data (mandible scan data), and at least one occlusion scan data, a step S120 of extracting tooth area data from the scan data, a step S130 of aligning the scan data, a step S140 of adjusting an occlusion position of the upper jaw scan data and the lower jaw scan data, and a step S150 of selecting data according to a predetermined criterion. By performing the above steps, a sophisticated three-dimensional model can be obtained, and a user can provide optimal treatment to a patient.

Hereinafter, each step of the occlusion alignment method according to the present disclosure will be described in detail.

FIGS. 2 to 5 are views for explaining the upper jaw scan data, the lower jaw scan data, and the occlusion scan data in the occlusion alignment method according to the present disclosure.

Figure 2:
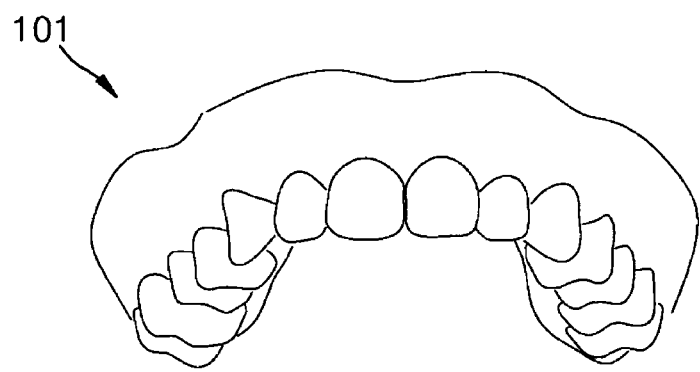
FIGS. 2 to 5 are views for explaining upper jaw scan data, lower jaw scan data, and occlusion scan data in the occlusion alignment method according to the present disclosure.
Figure 3:
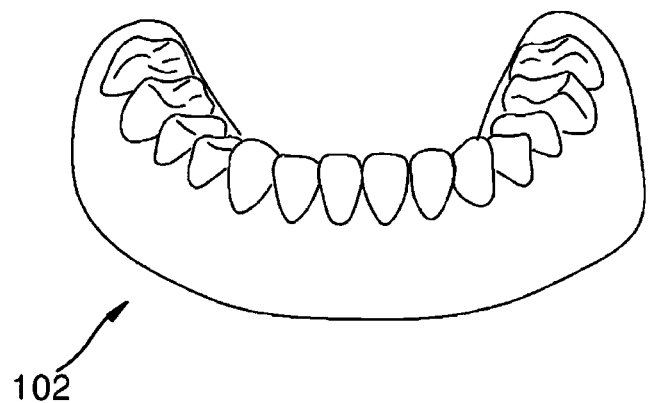
Figure 4:
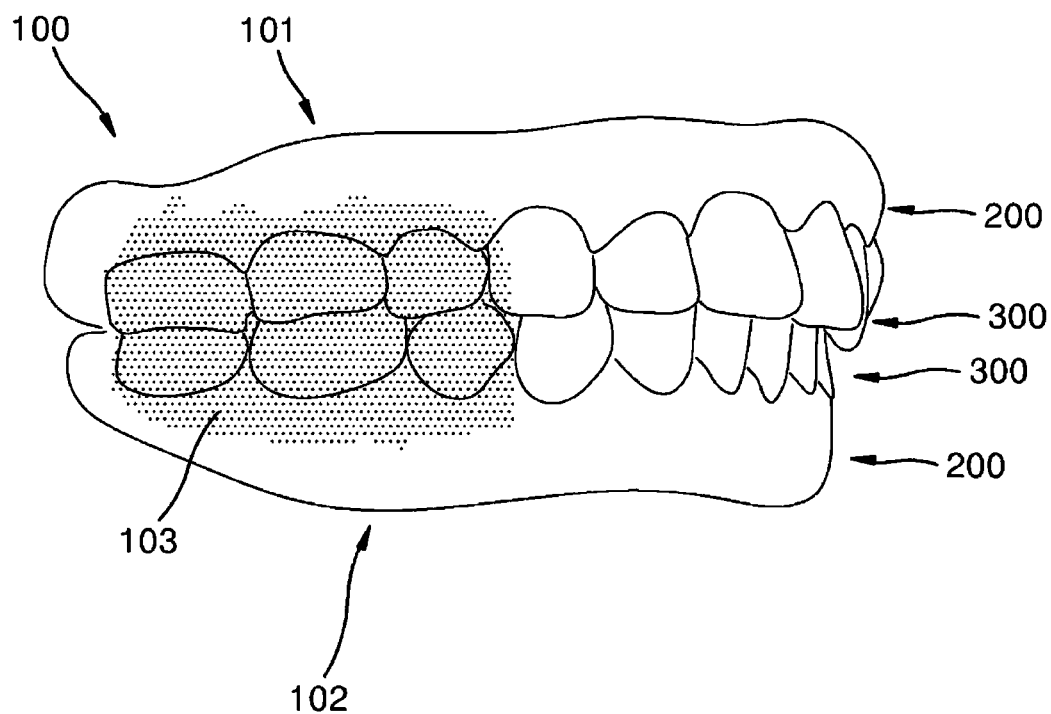
Figure 5:
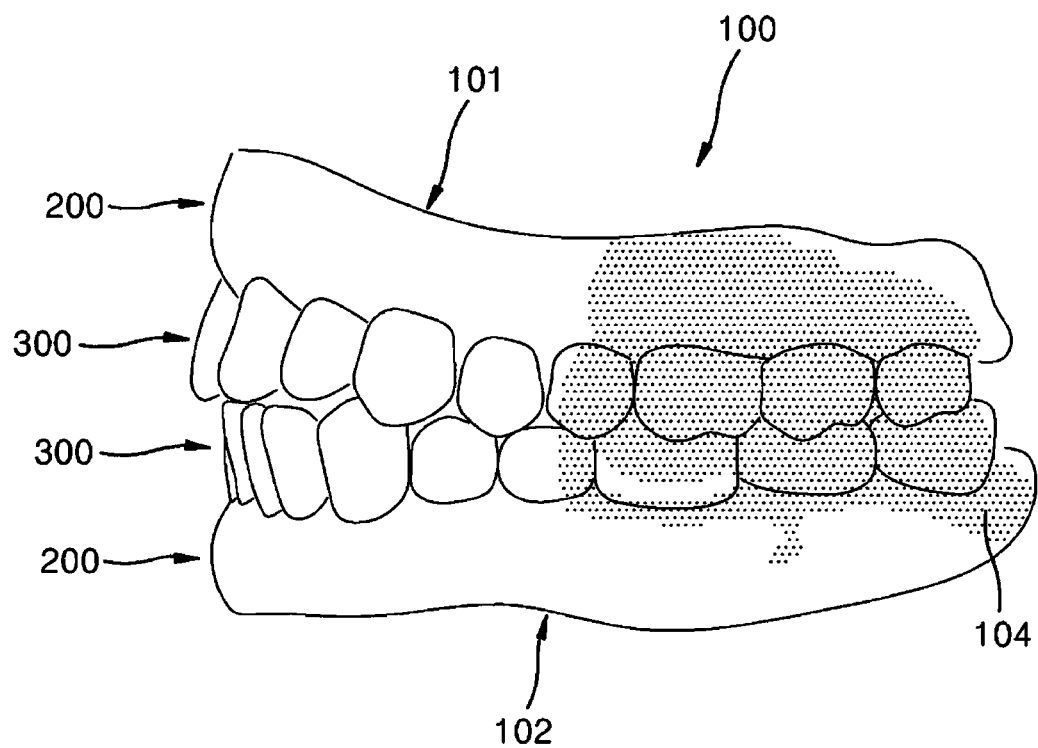

Referring to FIGS. 2 to 5, the scan data acquired in the step S110 of obtaining the scan data are shown. For example, FIG. 2 is the upper jaw scan data 101, FIG. 3 is the lower jaw scan data 102, FIG. 4 is the first occlusion scan data 103, and FIG. 5 is the second occlusion scan data 104. Other additional scan data may be acquired as needed. For example, third occlusion scan data (not shown) may be acquired for more sophisticated alignment of the upper jaw scan data 101 and the lower jaw scan data 102. In addition, partial scan data (not shown) may be additionally acquired for precise data acquisition of a specific portion of an oral cavity.

The step S110 of acquiring the scan data may mean photographing the inside of the oral cavity of a patient using a three-dimensional scanner. The scan data includes the patient's upper jaw, lower jaw, and bite position, and the scan data are combined and aligned to generate a three-dimensional model of the patient's entire oral cavity.

The step S110 of acquiring the scan data may be performed using a three-dimensional scanner, for example, a handheld-scanner, more specifically an intraoral scanner, which is capable of acquiring data by scanning the inside of the oral cavity of the patient. The three-dimensional scanner can scan teeth, gingiva, dental arch, etc. inside the oral cavity, and can acquire information such as curves and color of each.

Figure 6:
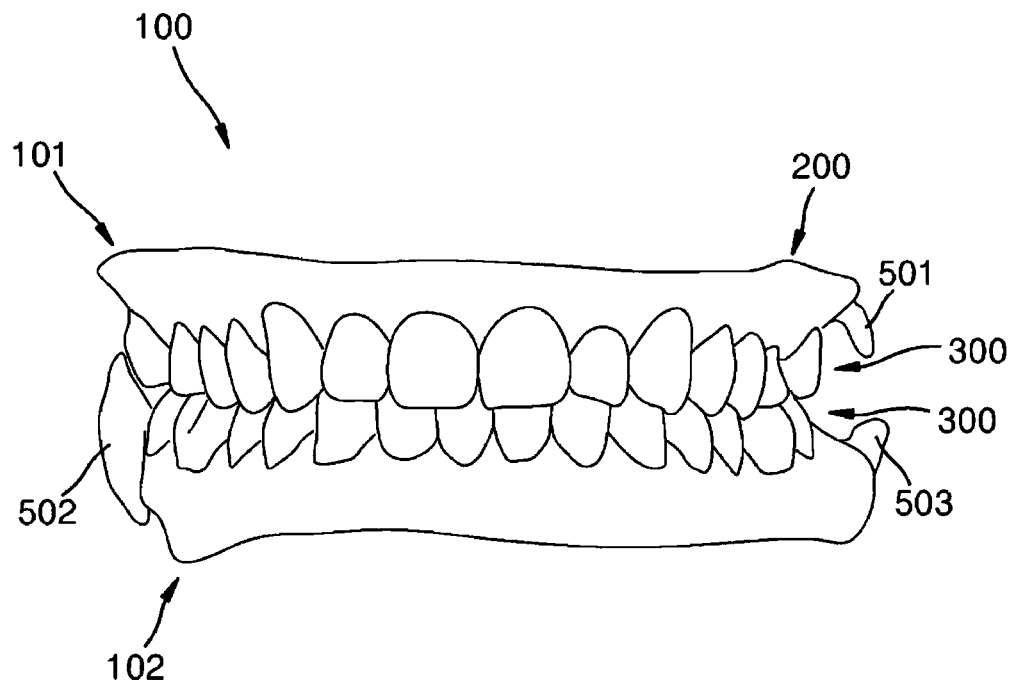
FIG. 6 is a view for explaining buccal area data excluded when extracting a tooth area in the occlusion alignment method according to the present disclosure.

FIG. 6 is a view for explaining buccal area data 501, 502, and 503 that are excluded when extracting a tooth area in the occlusion alignment method according to the present disclosure.

Referring to FIG. 6, a step S120 of extracting the tooth area data from the obtained scan data 100 may be performed. In the step S120 of extracting the data, it is possible to distinguish which object each data means, based on information of the scan data 100. In a process of distinguishing the data, the scan data 100 can be divided into gingival area data 200, tooth area data 300, and buccal area data 501, 502, and 503 according to an artificial intelligence-learned algorithm. In this case, the 'buccal area' may mean an inner area of a cheek. The artificial intelligence-learned algorithm may be an algorithm in which an internal structure of an oral cavity related to teeth, gingiva, etc. is learned using deep learning technology. For example, the algorithm may use at least one of those including a deep neural network (DNN), a convolution neural network (CNN), a recurrent neural network (RNN), a generative adversarial network (GAN), and the like. Data learned by the algorithm may be a shape or color of teeth, gingiva, and bucca.

In addition, according to the above, the tooth area data 300 is extracted using the artificial intelligence, but without being limited thereto, various methods of extracting the tooth area data 300 may be used.

Meanwhile, in the step S120 of extracting the data, the tooth area data 300 may be extracted from the scan data 100 as needed. More specifically, in the step S120 of extracting the data, data corresponding to the tooth area may be distinguished from the upper jaw scan data 101, and data corresponding to the tooth area may be distinguished from the lower jaw scan data 102. Among the scan data 100, using the tooth area data 300 is advantageous in acquiring optimal occlusion. That is, by performing the step S140 of adjusting the occlusion position to be described later using the tooth area data 300, it is possible to prevent the occlusion position from being misadjusted by areas other than the tooth area. In particular, when the buccal area data 501, 502, and 503 are used in the step S140 of adjusting the occlusion position, there is a high possibility that the occlusion position will be misadjusted. Therefore, the buccal area data 501, 502, and 503 are not extracted in the step S120 of extracting the data so that the tooth area data 300 or the gingival area data 200 and the tooth area data 300 together can be used to adjust the occlusion position.

In addition, in the step S120 of extracting the data, a process of segmenting teeth may be performed while extracting the tooth area data 300. The process of segmenting the teeth can also be performed according to an artificial intelligence-learned algorithm, and the type of teeth can be individually identified according to the shape, color, shade, curve, size, etc. of the teeth. For example, the process of segmenting the teeth may mean dividing the teeth included in the upper jaw scan data 101 or the lower jaw scan data 102 into segmented molars, canines, and incisors, respectively. Additionally, the identified teeth may be assigned tooth numbers according to where the teeth are located. For example, the tooth numbers may be assigned based on a universal numbering system.

Meanwhile, the step S120 of extracting the data is shown to be performed before the step S130 of aligning the scan data, but is not necessarily limited to that order. This step S120 may be performed before the step S140 of adjusting the occlusion position so that it is also possible to adjust the upper jaw scan data 101 and the lower jaw scan data 102 using the tooth area data when adjusting the occlusion position.

In addition, the step S120 of extracting the data may be performed simultaneously with the step S110 of acquiring the scan data. For example, during the step S110 of acquiring the scan data, the tooth area data 300 may be divided and thereafter used in the step S140 of adjusting the occlusion position.

Figure 7:
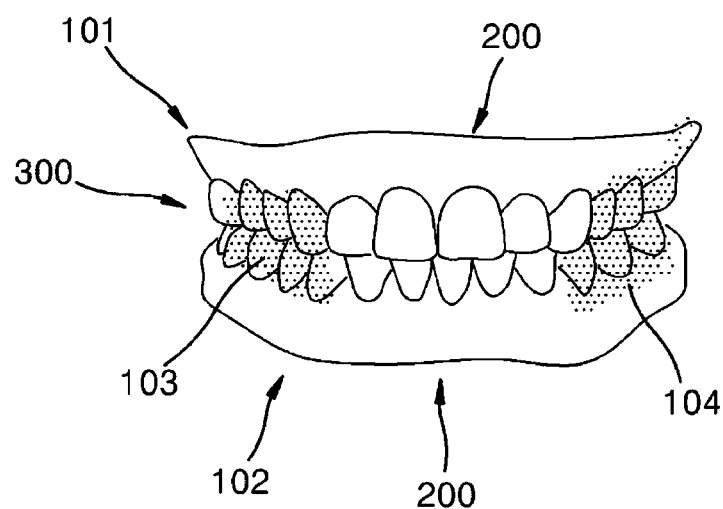
FIG. 7 is a view for explaining that the upper jaw scan data, the lower jaw scan data, and the occlusion scan data are aligned to generate first alignment data in the occlusion alignment method according to the present disclosure.

FIG. 7 is a view for explaining that the upper jaw scan data 101, the lower jaw scan data 102, and the occlusion scan data 103 and 104 are aligned to generate first alignment data in the occlusion alignment method according to the present disclosure.

Referring to FIG. 7, the occlusion alignment method according to the present disclosure includes the step S130 of aligning the scan data. In the step S110 of acquiring the scan data, a user may acquire the upper jaw scan data 101, the lower jaw scan data 102, and at least one of the occlusion scan data 103 and 104 for the inside of the patient's oral cavity. The occlusion scan data 103 and 104 may refer to data obtained by scanning the buccal surfaces of the upper jaw and lower jaw in a bite position where the upper jaw and lower jaw engage with each other when the patient's mouth is closed. The occlusion scan data 103 and 104 may include a portion of the tooth area data of the upper jaw scan data 101 and a portion of the tooth area data of the lower jaw scan data 102. Since the occlusion scan data 103 and 104 include the portions of the upper jaw scan data 101 and the lower jaw scan data 102, the scan data 100 may be aligned through the occlusion scan data 103 and 104 to generate the first alignment data. The upper jaw scan data 101, the lower jaw scan data 102, and the occlusion scan data 103 and 104 may be aligned to generate the first alignment data.

In the step S130 of aligning the scan data, alignment may be performed using all areas of the upper jaw scan data 101 and the lower jaw scan data 102. For example, in the step S130 of aligning the scan data, alignment may be performed using the tooth area data 300 and the gingiva area data 200 of the upper jaw scan data 101, the tooth area data 300 and the gingiva area data 200 of the lower jaw scan data 102, and the like.

When generating the first alignment data, an overlapped portion between the upper jaw scan data 101 and the occlusion scan data 103 and 104 may be matched, and an overlapped portion between the lower jaw scan data 102 and the occlusion scan data 103 and 104 may be matched. For example, the upper jaw scan data 101, the lower jaw scan data 102, and the occlusion scan data 103 and 104 may be aligned at the same time. The generated first alignment data represents the inside of the patient's oral cavity, and the user may provide treatment suitable for the patient through the first alignment data. In addition, when the occlusion scan data 103 and 104 are acquired, the first alignment data may be generated as the upper jaw scan data 101, the lower jaw scan data 102, and the occlusion scan data 103 and 104 are automatically and/or manually aligned.

Meanwhile, a plurality of occlusion scan data 103 and 104 used to generate the first alignment data may be acquired. For example, the occlusion scan data 103 and 104 may include the first occlusion scan data 103 acquired by scanning one side of the upper jaw and lower jaw in the bite position, and the second occlusion scan data 104 acquired by scanning the other side of the upper jaw and lower jaw at a position different from that of the first occlusion scan data 103 while in the bite position. That is, the first alignment data may be generated using one or more occlusion scan data 103 and 104. In addition, when two or more occlusion scan data 103 and 104 such as the first occlusion scan data 103 and the second occlusion scan data 104 are used, the upper jaw scan data 101 and the lower jaw scan data 102 may be more precisely aligned. Thus, more sophisticated first alignment data can be acquired, and the user can provide more suitable treatment to the patient.

The first alignment data generated in the above-described step S130 of aligning the scan data represents the patient's oral cavity, but the patient's bite position may change when the occlusion scan data 103 and 104 are acquired. For example, when using one occlusion scan data to align the upper jaw scan data 101 and the lower jaw scan data 102, there is a disadvantage in that inaccurate alignment may be performed. In addition, even if two or more occlusion scan data are used, if the patient's masticatory force changes when acquiring the first occlusion scan data 103 and when acquiring the second occlusion scan data 104, since the alignment in the first occlusion scan data 103 and the alignment in the second occlusion scan data 104 are not uniformly performed, there is a disadvantage in that optimized aligned data cannot be acquired.

In order to solve the above-mentioned disadvantages, the occlusion alignment method according to the present disclosure includes the step S140 of adjusting the occlusion position by performing compensation alignment.

Figure 8:
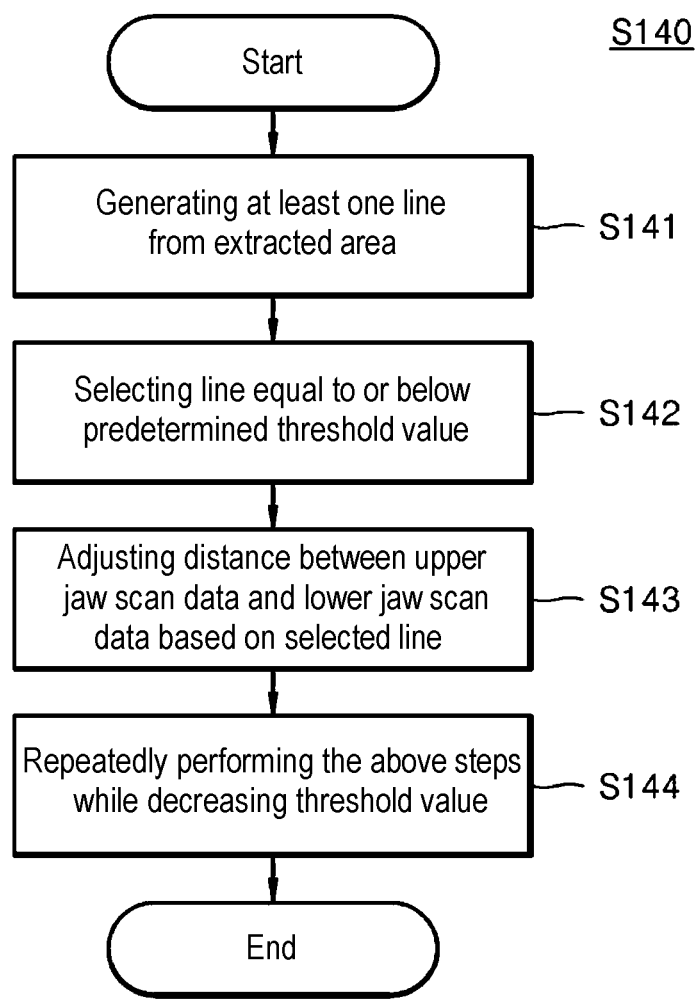
FIG. 8 is a detailed flowchart of a step of adjusting an occlusion position in the occlusion alignment method according to the present disclosure.
Figure 9:
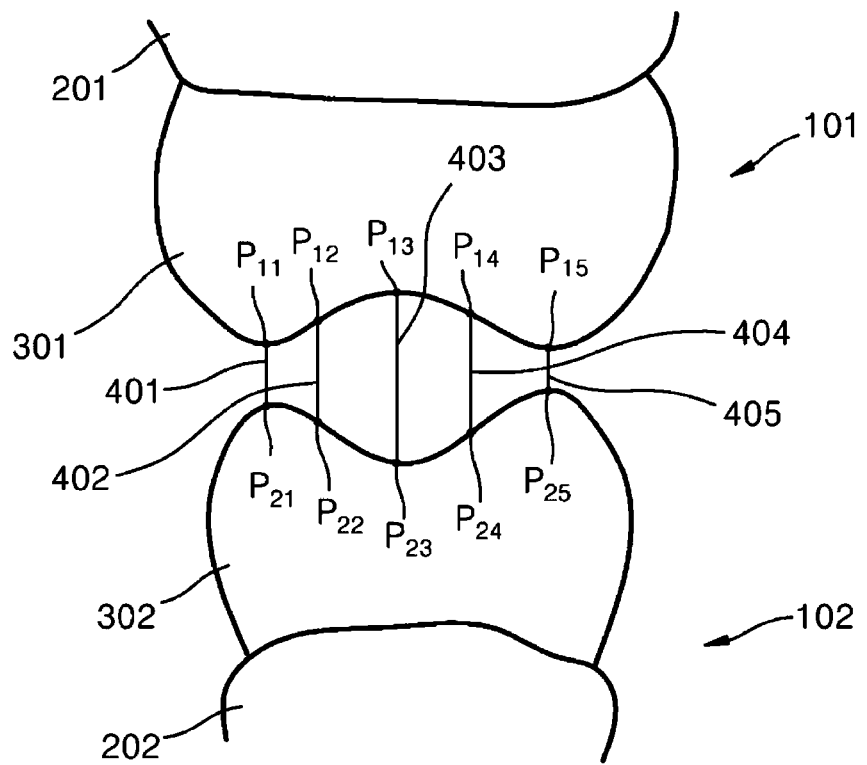
FIGS. 9 to 11 are views for explaining the step of adjusting the occlusion position in the occlusion alignment method according to the present disclosure.
Figure 10:
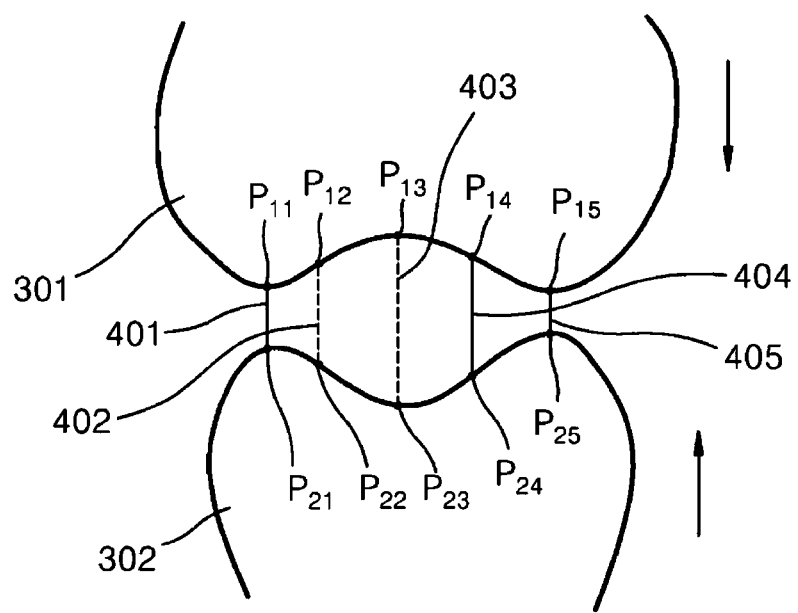
Figure 11:
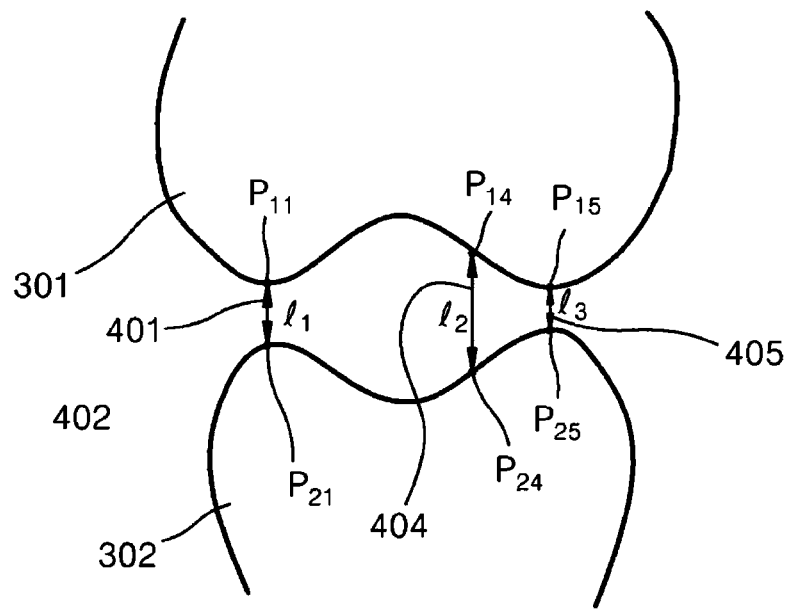
Figure 12:
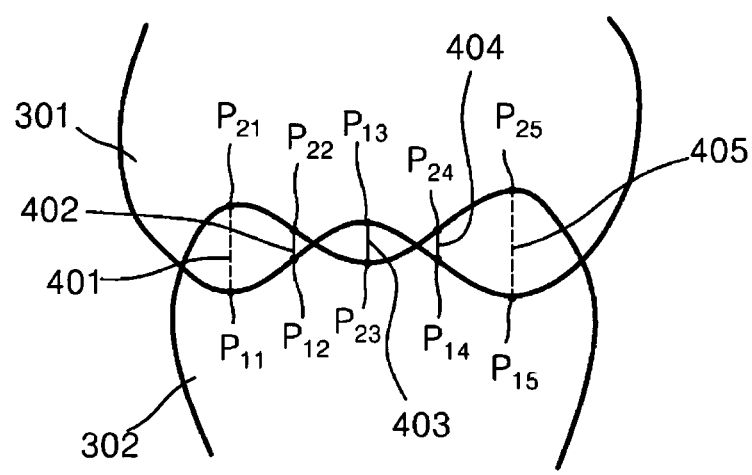
FIGS. 12 and 13 are views for explaining a step of adjusting an occlusion position in an occlusion alignment method according to another embodiment of the present disclosure.
Figure 13:
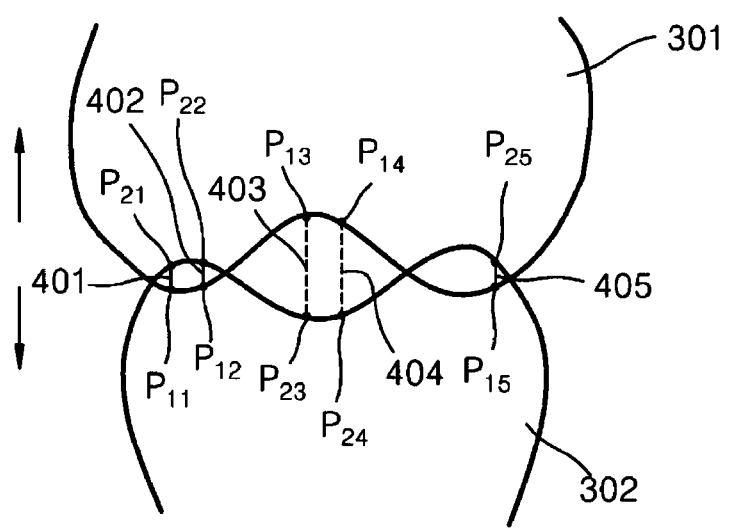

FIG. 8 is a detailed flowchart of the step of adjusting the occlusion position in the occlusion alignment method according to the present disclosure, and FIGS. 9 to 11 are views for explaining the step of adjusting the occlusion position in the occlusion alignment method according to the present disclosure. FIGS. 12 and 13 are views for explaining the step of adjusting the occlusion position in an occlusion alignment method according to another embodiment of the present disclosure.

First, a method of adjusting the occlusion position when the upper jaw and lower jaw are formed far apart because of the patient's weak masticatory force will be described.

Referring to FIG. 8, in the step S140 of adjusting the occlusion position, the occlusion position is adjusted by moving at least one of the aligned upper jaw scan data 101 and lower jaw scan data 102 of the first alignment data. For example, adjusting the occlusion position may mean that the upper jaw scan data 101 becomes closer in distance toward the lower jaw scan data 102. Alternatively, adjusting the occlusion position may mean that the upper jaw scan data 101 becomes farther away in distance from the lower jaw scan data 102. Adjusting the occlusion position may be moving the upper jaw scan data 101 while the lower jaw scan data 102 is fixed, and conversely, may be moving the lower jaw scan data 102 while the upper jaw scan data 101 is fixed. Alternatively, in the step S140 of adjusting the occlusion position, the upper jaw scan data 101 and the lower jaw scan data 102 may be mutually and appropriately moved to adjust the occlusion position.

The step S140 of adjusting the occlusion position includes a step S141 of generating at least one line from the extracted tooth area data, a step S142 of selecting a line equal to or below a predetermined threshold value, a step of S143 of adjusting a distance between the upper jaw scan data and the lower jaw scan data based on the selected line, and a step S144 of repeatedly performing the above steps while decreasing the threshold value.

Referring to FIG. 9, at least one line may be generated (S141) from the tooth area data 300 extracted in the above-described step S120 of extracting the data. At this time, a line is generated by referring to a tooth area 301 of the upper jaw scan data 101 and a tooth area 302 of the lower jaw scan data 102, and may be an imaginary line connecting at least one point on the surface of the tooth areas 301 and 302 of the upper jaw scan data 101 and/or the lower jaw scan data 102 and at least one point and/or face on the surface of the tooth areas 301 and 302 of the upper jaw scan data 101 and/or the lower jaw scan data 102. At this time, at least one point on the surface of the tooth areas 301 and 302 does not mean only points formed on the occlusion plane of the tooth areas 301 and 302 of the upper jaw scan data 101 and/or the lower jaw scan data 102, but may mean all points formed on the occlusion plane, labial side, lingual side, and buccal side.

A process of generating at least one line will be described below.

The line may be generated from a nearest neighboring test or a ray intersection test.

For example, the nearest neighboring test refers to a method of finding at least one point of the surface of the tooth area 302 of the lower jaw scan data 102 that is the closest in distance, to at least one point on the surface of the tooth area 301 of the upper jaw scan data 101. For example, the nearest neighboring test may be performed by decomposing a space using spatial search algorithms and finding a point having the closest distance within the decomposed space. When the nearest neighboring test is performed using the spatial search algorithms, a line can be generated by quickly finding a point in a short distance. However, the nearest neighboring test is not limited to using the spatial search algorithms, and may be performed using various algorithms such as machine learning.

In the following, a process of generating a line by performing the ray intersection test will be described in detail.

For example, five upper jaw points P11, P12, P13, P14, and P15 may be generated in the upper jaw tooth area 301 of the upper jaw scan data 101. The upper jaw points P11, P12, P13, P14, and P15 may be generated based on mesh data constituting the tooth area 301 of the upper jaw scan data 101. More specifically, in the mesh data constituting the tooth area 301 of the upper jaw scan data 101, the vertices of the mesh data may be generated as the upper jaw points P11, P12, P13, P14, and P15.

The ray intersection test may be performed at each of the upper jaw points P11, P12, P13, P14, and P15. The ray intersection test may generate rays in the normal vector direction of each of the upper jaw points P11, P12, P13, P14, and P15 at each of the upper jaw points P11, P12, P13, P14, and P15. The rays may reach the lower jaw scan data 102.

The rays generated by the ray intersection test has been described as being generated in the normal vector direction of each of the upper jaw points P11, P12, P13, P14, and P15, but are not necessarily limited thereto.

At least some of the generated rays may reach the lower jaw scan data 102 to generate lower jaw points P21, P22, P23, P24, and P25 intersecting with the at least some of the rays. For example, five lower jaw points P21, P22, P23, P24, and P25 intersecting with the rays may be generated in the lower jaw tooth area 302 of the lower jaw scan data 102. At this time, the lower jaw points P21, P22, P23, P24, and P25 may be formed in the tooth area 302 of the lower jaw scan data 102, but may not necessarily be the vertices of the mesh constituting the tooth area 302. That is, the lower jaw points P21, P22, P23, P24, and P25 may be the vertices of the mesh in the tooth area 302 or may be a portion on a mesh plane in the tooth area 302.

As the lower jaw points P21, P22, P23, P24, and P25 are generated, a distance between the lower jaw points P21, P22, P23, P24, and P25 intersecting with the upper jaw points P11, P12, P13, P14, and P15 can be acquired. In this case, the distance between the lower jaw points may be the shortest distance in a straight line. For example, a first line 401 having a first distance l1 may appear between the first upper jaw point P11 and the first lower jaw point P21, a second line 402 having a second distance l2 may appear between the second upper jaw point P12 and the second lower jaw point P22, a third line 403 having a third distance l3 may appear between the third upper jaw point P13 and the third lower jaw point P23, a fourth line 404 having a fourth distance l4 may appear between the fourth upper jaw point P14 and the fourth lower jaw point P24, and a fifth line 405 having a fifth distance l5 may appear between the fifth upper jaw point P15 and the fifth lower jaw points P25.

However, generating the five points in each of the upper jaw tooth area 301 and the lower jaw tooth area 302 is merely exemplary, and the ray intersection test may be performed at all points constituting the upper jaw tooth area 301 and at least some of the generated lines may be used to perform the compensation alignment.

In addition, according to the foregoing, it has been described that the vertices of the mesh data in the upper jaw tooth area 301 are generated as the upper jaw points P11, P12, P13, P14, and P15 and the ray intersection test is performed at the upper jaw points P11, P12, P13, P14, and P15 to generate the lower jaw points P21, P22, P23, P24, and P25, but the present disclosure is not limited thereto.

That is, the vertices of the mesh data in the lower jaw tooth area 302 may be generated as the lower jaw points P21, P22, P23, P24, and P25 and the ray intersection test may be performed at the lower jaw points P21, P22, P23, P24, and P25 to generate the upper jaw points P11, P12, P13, P14, and P15. Meanwhile, referring to FIG. 10, only lines equal to or below the predetermined threshold value may be selected (S142) from the generated lines 401, 402, 403, 404, and 405. For example, lines having a threshold value of 0.5 mm or less may be selected. FIG. shows that the first line 401, the fourth line 404, and the fifth line 405 having lengths equal to or below the threshold value are selected and the second line 402 and the third line 403 are not selected. Based on the selected lines (the first line, the fourth line, and the fifth line), compensation alignment may be performed to adjust the distance between the upper jaw scan data 101 and the lower jaw scan data 102 (S143). In this case, the compensation alignment may mean an Iteration Closest Point (ICP) alignment that minimizes the sum of distances between points included in the selected lines in order to compensate for the patient's weak masticatory force. Meanwhile, when the sum of distances between points included in the selected lines is decreased, the distance between the upper jaw scan data 101 and the lower jaw scan data 102 may be adjusted.

After the lines having lengths equal to or below the threshold value are selected and the compensation alignment is performed, the compensation alignment may be repeatedly performed (S144) while decreasing the threshold value. For example, when the compensation alignment is performed based on lines having a length of 0.5 mm below a first threshold value, the compensation alignment may be thereafter performed based on lines having a length of 0.2 mm below a second threshold value. In this way, by repeatedly performing the compensation alignment a predetermined number of times while gradually decreasing the threshold value, there is an advantage in that the occlusion position can be precisely aligned.

Referring to FIG. 11, when performing the compensation alignment, the positions of the upper jaw scan data and the lower jaw scan data may be moved so that the sum of the lengths of the selected lines is minimized. In this case, the sum of the lengths may mean the sum of absolute value distances between the upper jaw points and the lower jaw points of the selected lines. For example, the positions of the upper jaw scan data and the lower jaw scan data may be moved so that the sum (l1+l4+l5) of the first length l1 of the first line 401, the fourth length l4 of the fourth line 404, and the fifth length l5 of the fifth line 405 is minimized. At the positions where the sum of the lengths is minimized, it is determined that the optimal compensation alignment has been performed through the corresponding threshold value. In this way, data obtained by performing the optimal compensation alignment is referred to as second alignment data, and the user may select at least one of the second alignment data and the first alignment data.

In addition, according to the foregoing, it has been described that the compensation alignment is performed using only points in the tooth area, but the ray intersection test and the compensation alignment may also be performed at points in the gingival areas 201 and 202.

Hereinafter, a method of adjusting the occlusion position when the upper jaw and lower jaw are formed close to each other due to the patient's strong masticatory force will be described.

FIGS. 12 and 13 are views for explaining the step of adjusting the occlusion position in an occlusion alignment method according to another embodiment of the present disclosure.

Referring to FIG. 12, a process of adjusting the occlusion position when the patient's masticatory force is strong to form the upper jaw scan data and the lower jaw scan data close to each other is shown. Lines are generated by referring to the tooth area 301 of the upper jaw scan data and the tooth area 302 of the lower jaw scan data. For example, five upper jaw points P11, P12, P13, P14, and P15 may be formed in the tooth area 301 of the upper jaw scan data 101, and five lower jaw points P21, P22, P23, P24, and P25 at which the rays hit the tooth area 302 of the lower jaw scan data 102 may be formed by performing the ray intersection test at the upper jaw points P11, P12, P13, P14, and P15. A first distance, a second distance, a third distance, a fourth distance, and a fifth distance between the upper jaw points P11, P12, P13, P14, and P15 and the lower jaw points P21, P22, P23, P24, and P25, respectively, may be measured, and only lines with distances equal to or below a threshold value may be selected to use for compensation alignment. In this case, the compensation alignment may mean adjusting the occlusion position by moving the upper jaw scan data in a direction away from the lower jaw scan data as a whole so that the sum of distances between points included in the selected lines decreases.

For example, referring to FIG. 12, lines with distances below the threshold value are shown as solid lines, and lines having distances exceeding the threshold value are shown as dotted lines. That is, since the first line 401 and the fifth line 405 have distances exceeding the threshold value, they are not used for compensation alignment, and since the second line 402, the third line 403, and the fourth line 404 have distances equal to or below the threshold value, they may be used for compensation alignment.

When the compensation alignment is performed based on the lines selected in FIG. 12, an overlapped portion between the tooth area 301 of the upper jaw scan data 101 and the tooth area 302 of the lower jaw scan data 102 is decreased. At this time, additional alignment may be performed while decreasing the threshold value in order to perform more sophisticated compensation alignment. As shown in FIG. 13, since the first line 401, the second line 402, and the fifth line 405 have distances below a new threshold value, they may be used for compensation alignment, and since the third line 403 and the fourth line 404 have distances exceeding the new threshold value, they may not be used for compensation alignment. Meanwhile, the new threshold value may be set to be smaller than the previous threshold value so that progressively finer compensation alignment is performed.

By adjusting the occlusion position in this way, there is an advantage in acquiring a three-dimensional model having an appropriate occlusion position in consideration of the patient's masticatory force.

Meanwhile, the above-described process can be applied equally even when the occlusion of the upper jaw scan data 101 and the lower jaw scan data 102 is misaligned. That is, even when the upper jaw scan data 101 is partially distorted with respect to the lower jaw scan data 102, the upper jaw scan data 101 and the lower jaw scan data 102 may generate imaginary lines through the above-mentioned nearest neighboring test and/or the ray beam intersection test, and a three-dimensional model having an appropriate occlusion position may be acquired through an alignment process based on the selected lines among the lines. For example, when the ray intersection test is performed at the upper jaw teeth of the upper jaw scan data 101, the rays may reach a portion of the lower jaw scan data 102 in a diagonal direction. Therefore, in this case, when the upper jaw scan data 101 and the lower jaw scan data 102 are ICP-aligned, the compensation alignment is performed so that the scan data 101 and 102 are moved in the diagonal direction, and as a result, even when the occlusion of the upper jaw scan data 101 and the lower jaw scan data 102 is misaligned, the above-described compensation alignment process may be performed in the same manner.

Meanwhile, when acquiring the upper jaw scan data 101, the user acquires buccal area data 501 together other than the tooth area 301 in the process of scanning the buccal surface of molars. Similarly, when acquiring the lower jaw scan data 102, buccal area data 502 and 503 other than the tooth area 302 may be acquired together. If the buccal area data 501, 502, and 503 acquired together are not excluded when performing compensation alignment, they may function as data used for compensation alignment in the above-mentioned ray intersection test. Accordingly, when the buccal area data 501, 502, and 503, which are substantially unnecessary for occlusion position compensation, serve as data that are a basis for compensation alignment, there is a possibility that sophisticated occlusion position compensation may be hindered. Therefore, when performing the compensation alignment according to the step S140 of adjusting the occlusion position, the buccal area data 501, 502, and 503 of the upper jaw scan data 101 and the lower jaw scan data 102 should not be used.

In addition, if necessary, the step S140 of adjusting the occlusion position may be performed only when the number of the vertices of the mesh constituting the tooth area 301 of the upper jaw scan data 101 and the tooth area 302 of the lower jaw scan data 102 is equal to or larger than a predetermined number. If points constituting the tooth areas 301 and 302 are insufficient, the occlusion may be misaligned when the step S140 of adjusting the occlusion position is performed. Accordingly, if the number of points constituting the tooth areas 301 and 302 is small, the second alignment data according to the step S140 of adjusting the occlusion position may not be generated.

In the foregoing, it is specified that the buccal area data 501, 502, and 503 are not extracted, but it is not necessarily limited to not extracting only the buccal area data 501, 502, and 503. For example, data not extracted in the step S120 of extracting the data may include tongue area data, soft tissue data, and the like, in addition to the aforementioned buccal area data 501, 502, and 503. That is, in the step S120 of extracting the data, only the tooth area data 301 and 302 and the gingival area data 201 and 202 of the upper jaw scan data 101 and the lower jaw scan data 102 may be extracted and used.

Hereinafter, the step S150 of selecting at least one of the first alignment data and the second alignment data will be described.

Figure 14:
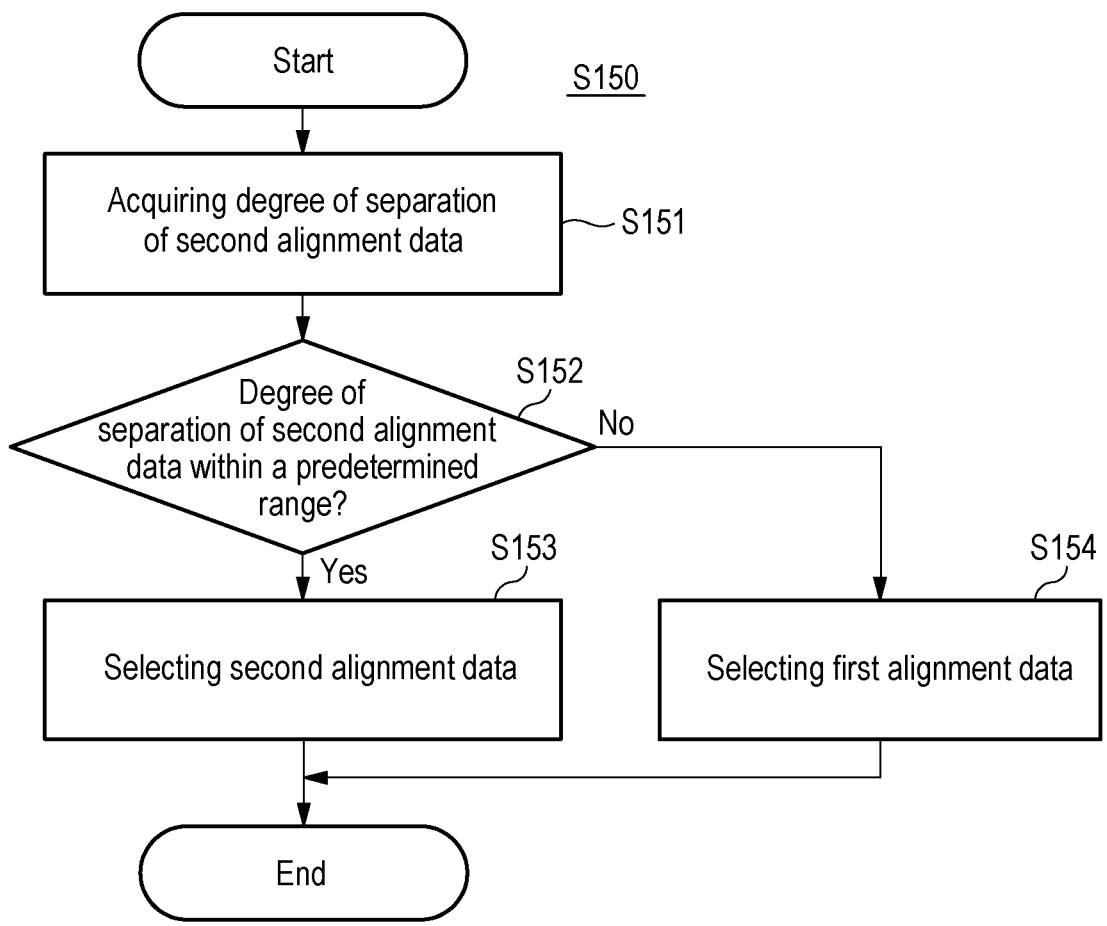
FIG. 14 is a detailed flowchart of a step of selecting at least one of first alignment data and second alignment data in the occlusion alignment method according to the present disclosure.
Figure 15:
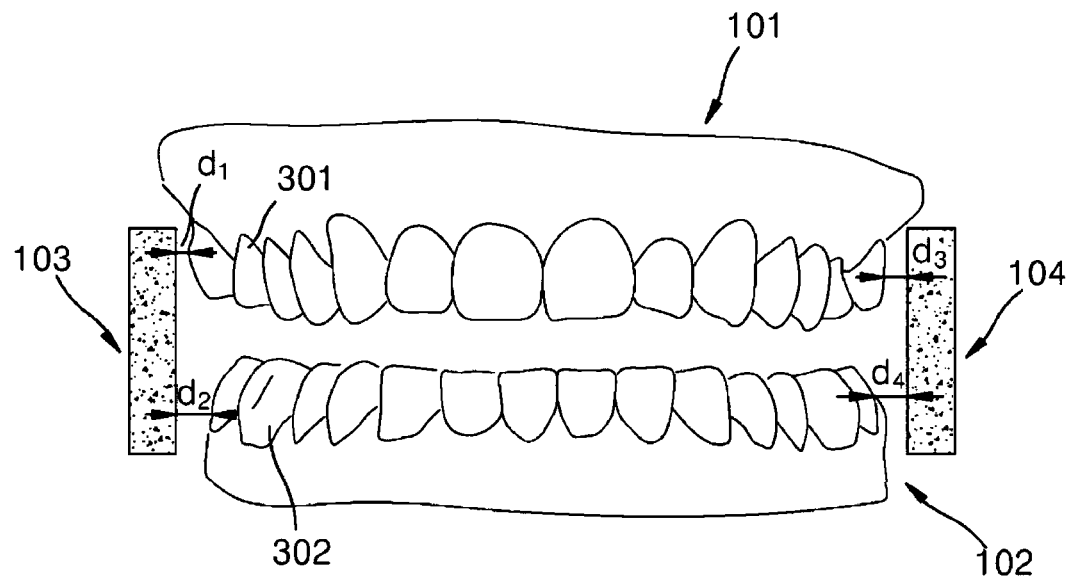
FIG. 15 is a view for explaining a degree of separation, which is an example of a basis for selection, in the occlusion alignment method according to the present disclosure.

FIG. 14 is a detailed flowchart of a step of selecting at least one of the first alignment data and the second alignment data in the occlusion alignment method according to the present disclosure, and FIG. 15 is a view for explaining a degree of separation, which is an example of a basis for selection, in the occlusion alignment method according to the present disclosure.

Referring to FIGS. 14 and 15, the occlusion alignment method according to the present disclosure may select at least one of the first alignment data and the second alignment data according to a predetermined criterion (S150). More specifically, the occlusion alignment method according to the present disclosure enables selection of data capable of providing optimal treatment to a patient through more sophisticated occlusion alignment of the first alignment data and the second alignment data.

For example, in the selecting step S150, a degree of separation of the second alignment data may be acquired (S151). In this case, the degree of separation may mean the sum of distances from at least one of the upper jaw scan data 101 and the lower jaw scan data 102 to the occlusion scan data 103 and 104. For example, the degree of separation may be the sum of a first separation distance d1, a second separation distance d2, a third separation distance d3, and a fourth separation distance d4, as shown in FIG. 15. The first separation distance d1 may mean a distance between the upper jaw scan data 101 and the first occlusion scan data 103, the second separation distance d2 may mean a distance between the lower jaw scan data 102 and the first occlusion scan data 103, the third separation distance d3 may mean a distance between the upper jaw scan data 101 and the second occlusion scan data 104, and the fourth separation distance d4 may mean a distance between the lower jaw scan data 102 and the second scan data 104. In addition, the first to fourth separation distances d1, d2, d3, and d4 may mean the shortest distance from the tooth area 301 of the upper jaw scan data 101 and the tooth area 302 of the lower jaw scan data 102 to the first occlusion scan data 103 and the second occlusion scan data 104, respectively. Accordingly, the degree of separation may mean the sum of all separation distances d1+d2+d3+d4.

Meanwhile, when a ray generated at one point on the upper jaw scan data 101 or the lower jaw scan data 102 intersects with the occlusion scan data 103 and 104, the separation distance may mean the length of a line formed by the one point and a point acquired by the ray intersection. A process of acquiring the separation distance is the same as performing the ray intersection test between the upper jaw scan data 101 and the lower jaw scan data 102 to acquire a line and measuring the length of the corresponding line.

However, this is exemplary, and the degree of separation may be a distance (shortest distance) from at least one of the upper jaw scan data 101 and the lower jaw scan data 102 to the occlusion scan data 103 and 104. Alternatively, the degree of separation may mean a volume between at least one of the upper jaw scan data 101 and the lower jaw scan data 102 and the occlusion scan data 103 and 104. That is, the degree of separation may be any value indicating a degree of separation between at least one of the upper jaw scan data 101 and the lower jaw scan data 102 and the occlusion scan data.

Meanwhile, even in the above-mentioned first alignment data, it is possible to acquire a degree of separation which is a distance between at least one of the upper jaw scan data 101 and the lower jaw scan data 102 and the occlusion scan data 103 and 104. The degree of separation obtained in the first alignment data is called a first separation degree, and the degree of separation obtained in the second alignment data is called a second separation degree.

If the second degree of separation is acquired, the second degree of separation and the first degree of separation may be compared (S152). At this time, it may be determined whether or not the second degree of separation of the second alignment data is within a predetermined range. For example, it may be determined whether or not the second degree of separation of the second alignment data is within a predetermined multiple range of the first degree of separation of the first alignment data. The predetermined multiple range may be, for example 1.5 to 2 times. That is, a step of comparing the second degree of separation and the first degree of separation may include determining whether or not the second degree of separation falls within a range of 2 times or less, specifically, 1.5 times or less, of the first separation degree. When the second degree of separation falls within the predetermined multiple range of the first separation degree, it may be determined that a three-dimensional model having the optimal occlusion position is acquired without the second alignment data largely distorting the inside of the patient's oral cavity. However, if the second degree of separation does not fall within the predetermined multiple range of the first separation degree, it may be determined that a three-dimensional model distorting the inside of the patient's oral cavity is acquired, in which case, it is reasonable to use the first alignment data. Accordingly, when the second degree of separation of the second alignment data falls within the predetermined multiple range of the first separation degree, the second alignment data may be selected (S153), and otherwise, the first alignment data may be selected (S154). Accordingly, by selecting alignment data having an optimal occlusion position within a range that does not distort the inside of the patient's oral cavity, there is an advantage in that the user can provide optimal treatment to the patient.

Meanwhile, the process of generating the second alignment data different from the first alignment data according to the compensation alignment and selecting more appropriate alignment data by comparing the separation degrees of the first alignment data and the second alignment data may be performed depending on the user's selection. That is, the step of generating the second alignment data and selecting one of the first alignment data and the second alignment data is selectively performed. For example, the step of generating the first alignment data is necessarily performed, and the step of generating the second alignment data may be optionally performed by a user who desires to additionally align the first alignment data for compensation.

Hereinafter, an occlusion alignment apparatus that implements the occlusion alignment method according to the present disclosure, as an apparatus, will be described. In describing the occlusion alignment apparatus according to the present disclosure, contents overlapping with the above-described occlusion alignment method are briefly mentioned or omitted.

Figure 16:
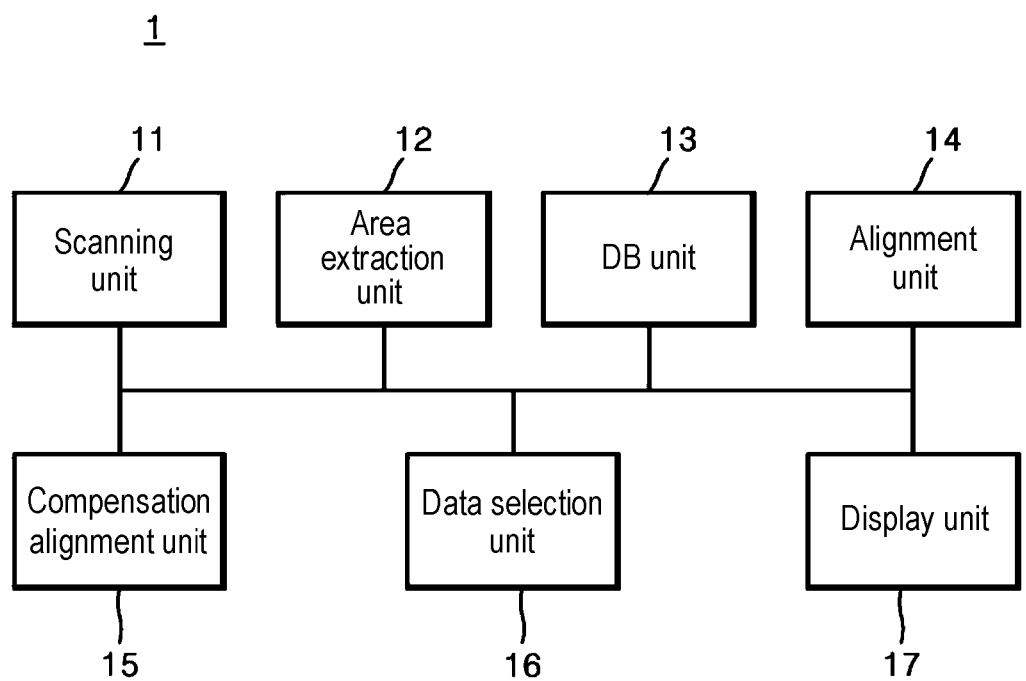
FIG. 16 is a configuration diagram of an occlusion alignment apparatus according to the present disclosure.

FIG. 16 is a configuration diagram of the occlusion alignment apparatus according to the present disclosure.

Referring to FIG. 16, the occlusion alignment apparatus 1 according to the present disclosure includes a scanning unit 11, an area extraction unit 12, a DB unit 13, an alignment unit 14, a compensation alignment unit 15, a data selection unit 16, and a display unit 17. Hereinafter, the configuration of each unit will be described.

The scanning unit 11 may acquire scan data by scanning the inside of the patient's oral cavity. At this time, the scan data includes upper jaw scan data, lower jaw scan data, and at least one occlusion scan data. The upper jaw scan data and the lower jaw scan data have information on teeth, gingiva, and bucca in the patient's oral cavity. In addition, the occlusion scan data has an area overlapping with each of the upper jaw scan data and the lower jaw scan data in the bite position of the patient, and the initial positions of the upper jaw scan data and the lower jaw scan data may be aligned through the occlusion scan data. A process of acquiring the scan data by the scanning unit 11 is as described above, and the scanning unit 11 may be a three-dimensional scanner.

The area extraction unit 12 may extract tooth area data from the upper jaw scan data and the lower jaw scan data acquired by the scan data acquisition process of the scanning unit 11. Such a process may be performed through a pre-learned artificial intelligence algorithm. The artificial intelligence algorithm may be loaded into the DB unit 13. Alternatively, the pre-learned artificial intelligence algorithm may learn the learning data of the teeth stored in the DB unit 13 in a deep learning manner and distinguish the characteristics of the data representing the teeth. Meanwhile, the area extraction unit 12 may extract the tooth area data from the scan data (the upper jaw scan data and the lower jaw scan data) to use the tooth area data when performing the compensation alignment for adjusting the occlusion position. By performing the compensation alignment using the tooth area data, there is an advantage in that it is possible to exclude the buccal area data and the like that hinder sophisticated adjustment of the occlusion position and to allow the compensation alignment unit 15 to perform precise compensation alignment.

If necessary, the area extraction unit 12 may extract the gingival area data as well as the tooth area data. Accordingly, the compensation alignment may be performed using the extracted tooth area data and gingival area data.

The alignment unit 14 may generate the first alignment data by aligning the scan data acquired by the scanning unit 11. For example, the alignment unit 14 may simultaneously align the upper jaw scan data, the lower jaw scan data, and at least one occlusion scan data. Two or more occlusion scan data may be used for more sophisticated alignment. For example, the occlusion scan data may include the first occlusion scan data acquired by scanning one side of the upper jaw and lower jaw in the bite position, and the second occlusion scan data acquired by scanning the other side of the upper jaw and lower jaw at a position different from that of the first occlusion scan data in the bite position. When the two or more occlusion scan data such as the first occlusion scan data and the second occlusion scan data are used, the upper jaw scan data and the lower jaw scan data may be more precisely aligned. A process of generating the first alignment data is the same as described above.

The first alignment data generated by the alignment unit 14 represents the inside of the patient's scanned oral cavity, but the occlusion position may need to be adjusted according to the bite position of the patient. Accordingly, the occlusion position may be adjusted by moving at least one of the upper jaw scan data and the lower jaw scan data based on the first alignment data. When the upper jaw scan data and the lower jaw scan data are formed far apart because of the patient's weak masticatory force, an optimal occlusion position may be acquired by moving the upper jaw scan data and the lower jaw scan data to be closer to each other. In addition, when the upper jaw scan data and the lower jaw scan data are formed close to each other because of the patient's strong masticatory force, an optimal occlusion position may be acquired by moving the upper jaw scan data and the lower jaw scan data to be farther apart from each other. In order to perform the compensation alignment to acquire the optimal occlusion position, predetermined points on the upper jaw scan data and the lower jaw scan data may be selected based on the mesh constituting the tooth area data. For example, at least some of the vertices of the mesh data constituting the tooth area of the upper jaw scan data may be determined as the upper jaw points, and a portion of the lower jaw scan data that the rays hit may be determined as the lower jaw points by performing the ray intersection test at the upper jaw points. In addition, after measuring distances between the points, the length of lines connecting the points may be adjusted so as to minimize the sum of distances. That is, in order to minimize the sum of distances between the points, the upper jaw scan data and/or the lower jaw scan data may be moved to minimize the sum of lengths of selected lines.

At this time, a specific threshold value may be set and the length may be adjusted based on the selected lines equal to or below the threshold value. In addition, the compensation alignment unit 15 may acquire an optimal occlusion position by repeatedly performing the above process while gradually decreasing the threshold value. The optimal occlusion position may mean a position at which the sum of distances of the selected lines is minimized, and data having the optimal occlusion position is referred to as second alignment data. Meanwhile, the second alignment data may be different from the first alignment data. A process of performing compensation alignment to acquire the second alignment data is as described above.

The data selection unit 16 may select at least one of the first alignment data and the second alignment data according to a predetermined criterion (within a predetermined multiple range) by comparing the degrees of separation between the first alignment data and the second alignment data. At this time, the concept of the degree of separation is as described above, and when the second degree of separation of the second alignment data corresponds to 2 times or less (more specifically, 1.5 times or less) of the first degree of separation of the first alignment data, the data selection unit 16 may select the second alignment data as data to provide a treatment plan to a patient. However, if the second degree of separation does not fall within the predetermined multiple range of the first separation degree, it may be determined that data distortion has occurred in the second alignment data above a certain level, and the data selection unit 16 may select the first alignment data as data to provide a treatment plan to the patient.

In this way, by selecting alignment data that can provide more optimal treatment to the patient among the first alignment data and the second alignment data, a user can provide the patient with high-quality treatment.

At least some of the above-described operations performed by the occlusion alignment apparatus according to the present disclosure may be visually displayed through the display unit 17. The display unit 17 may be any device capable of visually displaying the process of performing the occlusion alignment method according to the present disclosure and the operations performed by the occlusion alignment apparatus according to the present disclosure, and may include display devices such as a monitor, a tablet screen, a beam projector, etc.

The above description is only an example of the technical ideas of the present disclosure, and various modifications and variations can be made by those skilled in the art without departing from the essential characteristics of the present disclosure.

Therefore, the embodiments disclosed in the present disclosure are intended to not limit but explain the technical ideas of the present disclosure, and the scope of the technical ideas of the present disclosure is not limited by these embodiments. The protection scope of the present disclosure should be construed according to the claims below, and all technical ideas within the equivalent range should be construed as being included in the scope of the present disclosure.

INDUSTRIAL APPLICABILITY

The present disclosure provides an occlusion alignment method and an occlusion alignment apparatus for performing compensation alignment so that the upper jaw and lower jaw of a patient have optimal occlusion.

What is claimed is:

1. An occlusion alignment method comprising:
    extracting at least one tooth area data from upper jaw scan data and lower jaw scan data; and
    adjusting an occlusion position of the upper jaw scan data and the lower jaw scan data using the at least one tooth area data,
    wherein the upper jaw scan data and the lower jaw scan data are aligned by at least one occlusion scan data generated by scanning an upper jaw and a lower jaw in a bite position so as to generate first alignment data, and
    wherein the adjusting the occlusion position includes forming at least one line between the upper jaw scan data and the lower jaw scan data based on the tooth area data, and generating second alignment data by adjusting a distance between the upper jaw scan data and the lower jaw scan data based on a length of the line.

2. The occlusion alignment method of claim 1, wherein extracting the at least one tooth area data includes not extracting buccal area data of the upper jaw scan data and the lower jaw scan data.

3. The occlusion alignment method of claim 1, wherein extracting the at least one tooth area data includes extracting only tooth area and gingival area of the upper jaw scan data and the lower jaw scan data.

4. The occlusion alignment method of claim 1, wherein a plurality of the occlusion scan data are acquired, and wherein the first alignment data is generated by simultaneously aligning the plurality of the occlusion scan data, the upper jaw scan data, and the lower jaw scan data.

5. The occlusion alignment method of claim 1, wherein the line is formed by connecting at least one point of mesh data constituting a tooth area of at least one scan data of the upper jaw scan data and the lower jaw scan data and at least one point, which is nearest neighboring to the point, of mesh data constituting a tooth area of other scan data.

6. The occlusion alignment method of claim 1, wherein the line is formed by connecting at least one point of mesh data constituting a tooth area of at least one scan data of the upper jaw scan data and the lower jaw scan data and a portion at which a ray generated at the point hits a tooth area of other scan data.

7. The occlusion alignment method of claim 1, wherein a plurality number of the line is acquired, and
    wherein adjusting the occlusion position includes selecting lines having a length equal to or below a predetermined threshold value to adjust the distance between the upper jaw scan data and the lower jaw scan data.

8. The occlusion alignment method of claim 7, wherein adjusting the occlusion position includes adjusting the distance between the upper jaw scan data and the lower jaw scan data so as to minimize a sum of lengths of the selected lines.

9. The occlusion alignment method of claim 8, wherein adjusting the occlusion position is repeatedly performed a predetermined number of times while decreasing the threshold value.

10. The occlusion alignment method of claim 1, further comprising: selecting at least one of the first alignment data and the second alignment data according to a predetermined criterion,
    wherein the predetermined criterion is based on a first degree of separation which is a distance from at least one of the upper jaw scan data and the lower jaw scan data of the first alignment data to the occlusion scan data, and a second degree of separation which is a distance from at least one of the upper jaw scan data and the lower jaw scan data of the second alignment data to the occlusion scan data.

11. The occlusion alignment method of claim 10, wherein selecting the at least one of the first alignment data and the second alignment data includes selecting the second alignment data when the second degree of separation is within a predetermined multiple range of the first separation degree.

12. An occlusion alignment apparatus comprising:
    a scanning unit configured to scan an inside of an oral cavity of a patient to acquire upper jaw scan data, lower jaw scan data, and at least one occlusion scan data;
    an area extraction unit configured to extract tooth area data from scan data acquired from the scanning unit; and
    a compensation alignment unit configured to adjust an occlusion position of the upper jaw scan data and the lower jaw scan data using the tooth area data, wherein the upper jaw scan data and the lower jaw scan data are aligned by at least one occlusion scan data generated by scanning an upper jaw and a lower jaw in a bite position so as to generate first alignment data, and wherein, in the adjusting the occlusion position of the upper jaw scan data and the lower jaw scan data, the compensation alignment unit is further configured to form at least one line between the upper jaw scan data and the lower jaw scan data based on the tooth area data, and generate second alignment data different from the first alignment data by adjusting a distance between the upper jaw scan data and the lower jaw scan data based on a length of the line.

13. The occlusion alignment apparatus of claim 12, wherein the area extraction unit does not extract buccal area data of the upper jaw scan data and the lower jaw scan data.

14. The occlusion alignment apparatus of claim 12, wherein the line is formed using at least one method selected from a nearest neighboring test and a ray intersection test.

15. The occlusion alignment apparatus of claim 12, further comprising: a data selection unit configured to select at least one of the first alignment data and the second alignment data according to a predetermined criterion, wherein the predetermined criterion is based on a first degree of separation which is a distance from at least one of the upper jaw scan data and the lower jaw scan data of the first alignment data to the occlusion scan data, and a second degree of separation which is a distance from at least one of the upper jaw scan data and the lower jaw scan data of the second alignment data to the occlusion scan data.

16. The occlusion alignment apparatus of claim 15, wherein the data selection unit selects the second alignment data when the second degree of separation is within a predetermined multiple range of the first separation degree.

* * * * *